US012513377B2

(12) United States Patent
Lv et al.

(10) Patent No.: US 12,513,377 B2
(45) Date of Patent: Dec. 30, 2025

(54) ELECTRONIC DEVICE AND EXTENSION ASSEMBLY

(71) Applicant: HUAWEI TECHNOLOGIES CO., LTD., Guangdong (CN)

(72) Inventors: Danhua Lv, Shenzhen (CN); Kaijun Qian, Hangzhou (CN); Muhao Zhang, Hangzhou (CN); Junping Wan, Hangzhou (CN); Huangchao Zhu, Hangzhou (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 293 days.

(21) Appl. No.: 18/192,252

(22) Filed: Mar. 29, 2023

(65) Prior Publication Data

US 2023/0240027 A1    Jul. 27, 2023

Related U.S. Application Data

(63) Continuation of application No. PCT/CN2021/121232, filed on Sep. 28, 2021.

(30) Foreign Application Priority Data

Sep. 30, 2020 (CN) .......................... 202011066008.X

(51) Int. Cl.
*H04N 23/51* (2023.01)
(52) U.S. Cl.
CPC .................................. *H04N 23/51* (2023.01)
(58) Field of Classification Search
CPC ......... H04N 23/50; H04N 23/51; G03B 17/04

USPC ...................................................... 348/207.99
See application file for complete search history.

(56) References Cited

U.S. PATENT DOCUMENTS

| 11,401,743 | B2 * | 8/2022 | Coons ..................... E05C 19/14 |
| 2015/0181105 | A1 | 6/2015 | Huang et al. |
| 2017/0018253 | A1 | 1/2017 | Castaneda et al. |
| 2018/0088446 | A1 | 3/2018 | Muraki et al. |
| 2021/0234303 | A1 * | 7/2021 | Sato ..................... H01R 13/629 |

FOREIGN PATENT DOCUMENTS

| CN | 201174737 | Y | * 12/2008 |
| CN | 201222828 | Y | 4/2009 |
| CN | 102196690 | A | 9/2011 |
| CN | 102801904 | A | * 11/2012 |
| CN | 102801904 | B | 12/2015 |
| CN | 206498468 | U | 9/2017 |

(Continued)

*Primary Examiner* — Anthony J Daniels
(74) *Attorney, Agent, or Firm* — WOMBLE BOND DICKINSON (US) LLP

(57) ABSTRACT

An electronic device is provided, the electronic device includes a primary device assembly and an extension assembly. The primary device assembly includes a first housing and a primary body circuit, the first housing has a first accommodation cavity, and the primary body circuit is disposed in the first accommodation cavity. The extension assembly includes a second housing and an extension circuit. The second housing has a second accommodation cavity, the extension circuit is disposed in the second accommodation cavity, and the extension circuit is signal-connected to the primary body circuit, to extend or enhance functionality of the primary device assembly.

18 Claims, 9 Drawing Sheets

(56) References Cited

FOREIGN PATENT DOCUMENTS

| | | | |
|---|---|---|---|
| CN | 107225921 | A | 10/2017 |
| CN | 208479775 | U | 2/2019 |
| CN | 112074112 | A | 12/2020 |
| JP | H11298766 | A | 10/1999 |
| JP | 2013007871 | A | 1/2013 |
| JP | 2014225869 | A | 12/2014 |
| WO | 2013120228 | A1 | 8/2013 |
| WO | 2020093373 | A1 | 5/2020 |

* cited by examiner

ELECTRONIC DEVICE AND EXTENSION ASSEMBLY

CROSS-REFERENCE TO RELATED APPLICATIONS

This application is a continuation of International Application No. PCT/CN2021/121232, filed on Sep. 28, 2021, which claims priority to Chinese Patent Application No. 202011066008.X, filed on Sep. 30, 2020. The disclosures of the aforementioned applications are hereby incorporated by reference in their entireties.

TECHNICAL FIELD

This application relates to the technical field of electronic devices, and in particular, to an electronic device and an extension assembly.

BACKGROUND

Cameras are widely used in daily life of people. For example, cameras may be used in environments such as a road, a campus, and an indoor environment, to implement a function, for example, image capture. With development of science and technologies and continuous improvement of requirements of people, users hope that cameras can have richer functions. For example, some users hope that a camera can have a wireless communication function; and some users hope that a camera can have a function, such as facial recognition or vehicle license plate recognition. To meet different requirements of different users, a required functional circuit (for example, a communication circuit or a processor) may be added to a camera. However, during actual application, a required functional circuit is usually installed in a camera before delivery, but cannot be installed after delivery or on an application site. Consequently, functions of the camera are incomplete or redundant.

SUMMARY

This application provides an electronic device and an extension assembly that can facilitate flexible extension and installation.

According to one aspect, this application provides an electronic device, including a primary device assembly and an extension assembly. The primary device assembly includes a first housing and a primary body circuit, the first housing has a first accommodation cavity, and the primary body circuit is disposed in the first accommodation cavity. The extension assembly includes a second housing and an extension circuit. The second housing has a second accommodation cavity, the extension circuit is disposed in a second accommodation cavity, and the extension circuit is signal-connected to the primary body circuit, to extend or enhance functionality of the primary device assembly. To implement quick installation and disassembly between the extension assembly and the primary device assembly, the first housing has a first installation structure, the second housing has a second installation structure, and the first installation structure is detachably connected to the second installation structure, to implement a detachable connection between the extension assembly and the primary device assembly.

In an embodiment, types and quantities of extension circuits included in the extension assembly may be diversified. For example, the extension circuit may be a communication circuit, for example, a radar, a Wi-Fi module, a 4G communication module, a 5G communication module, or a Bluetooth module, or may be a device, for example, a graphics processing unit, an AI processing chip, or a memory.

During actual application, a required extension circuit may be installed in the extension assembly before delivery, or may be installed in the extension assembly on an engineering site, so that greater flexibility is achieved, and no adverse problem is caused, for example, incomplete functions or redundant functions. In addition, when the extension circuit is installed, the primary device assembly does not need to be disassembled or assembled, so that air tightness or the like of the primary device assembly is not affected.

In an embodiment, the first installation structure may include a slot disposed along a first direction, and the second installation structure may include a tongue disposed along the first direction. Specifically, the tongue may be inserted into the slot along the first direction, to implement a fixed connection between the first housing and the second housing. When the extension assembly and the primary device assembly are to be assembled, quick installation and disassembly between the extension assembly and the primary device assembly can be implemented through a mutual plug-connection and fit between the tongue and the slot. In addition, disassembly and assembly steps are simple, thereby helping improve convenience and efficiency of disassembly and assembly.

In an embodiment, to improve stability of a connection between the extension assembly and the primary device assembly, a detachable connection between the extension assembly and the primary device assembly may further be implemented by using another connection structure.

For example, a first connection hole may be provided with the first housing, a second connection hole may be provided with the second housing, and the first connection hole and the second connection hole are connected by using a fastener.

In an embodiment, the first connection hole may be a threaded hole, the second connection hole may be a through hole, and the fastener may be a bolt. During installation, the fastener may be inserted from one end of the second connection hole, and then the fastener is thread-connected to the first connection hole, to implement a detachable connection between the first connection hole and the second connection hole.

In another embodiment, specific types of the first connection hole, the second connection hole, and the fastener may be adaptively adjusted based on an actual requirement. For example, the first connection hole and the second connection hole may alternatively be pin holes or the like, and correspondingly, the fastener may be a pin or the like.

In an embodiment, to improve an effect of a connection between the first housing and the second housing, a disposing direction of the tongue (or the slot) and a disposing direction of the first connection hole (or the second connection hole) may be provided at an included angle.

Specifically, both the tongue and the slot are disposed along the first direction, and both the first connection hole and the second connection hole are provided along the second direction. After the tongue is inserted into the slot, position limiting may be formed on the first housing and the second housing in the second direction, to prevent the second housing from generating, in the second direction, position offset relative to the first housing. After the fastener is fixedly connected to the first connection hole and the second connection hole, position limiting may be formed on the first housing and the second housing in the first direction, to effectively prevent the second housing from generating, in the first direction, position offset relative to the first housing, to effectively improve relative stability between the first housing and the second housing, and avoid position offset between the first housing and the second housing. In addition, because a mutual fit between the tongue and the slot can form position limiting on the first housing and the second housing in the second direction, an adverse problem can be avoided to some extent, for example, loosening between the fastener and the first connection hole, or loosening between the fastener and the second connection hole.

In an embodiment, the included angle between the first direction and the second direction may be properly set based on different situations. Specifically, the included angle between the first direction and the second direction may be between 0° and 90°.

In an embodiment, to facilitate a signal connection between the primary device assembly and the extension assembly, the primary device assembly may further include a first connector, and the extension assembly may further include a second connector. When the extension assembly and the primary device assembly are to be assembled, a signal connection between the primary device assembly and the extension assembly can be implemented through docking between the first connector and the second connector.

In an embodiment, the first connector and the second connector may be plug-connected in the second direction, to improve installation convenience and reliability between the primary device assembly and the extension assembly. The first housing includes a housing body and a bracket.

In some embodiments, the first housing may include the housing body and the bracket. The housing body is detachably connected to the bracket.

In an embodiment, the first accommodation cavity may be disposed in the housing body; and the first installation structure may be disposed on the housing body or the bracket.

According to another aspect, this application further provides an extension assembly on which a shielding cover assembly is configured. The shielding cover assembly may be disposed on a top portion and a side portion of a second housing in a covering manner, to provide a good shielding effect on the second housing and prevent the second housing from being affected by sun exposure, rain, sand, dust, or the like.

In an embodiment, the shielding cover assembly may include a shielding cover body for covering a periphery of the second housing. The shielding cover body may be fixedly connected to the second housing in a clamping manner. A clamping hook may be disposed on the second housing, a slot is provided with the shielding cover body, and a quick connection between the shielding cover body and the second housing can be implemented through clamping and a fit between the clamping hook and the slot.

To facilitate removal of the shielding cover body from the second housing, the shielding cover assembly may further include a button. A user may separate the clamping hook from the slot by pressing the button, to separate the shielding cover body from the second housing. In an embodiment, the button may include a pressing portion for an operation by a human hand and a pressing portion for pushing the clamping hook. When the shielding cover assembly is removed from the second housing, the human hand acts on the pressing portion of the button to press the button. The pushing portion of the button pushes the clamping hook, so that the clamping hook is elastically deformed and separated from the slot, thereby facilitating removal of the shielding cover assembly from the second housing.

In an embodiment, when the button is pressed, to ensure that the button can be located on a correct moving path, a positioning rod may be further disposed for the button, a sliding hole may be provided with the shielding cover body, and the positioning rod is slidably disposed in the sliding hole. When the human hand exerts pressure on the button, the button can slide along a length direction of the positioning rod (or the sliding hole), so that a use effect of the button can be effectively improved.

In an embodiment, after the button is pressed, to enable the button to automatically return to a position used when the button is not pressed, the shielding cover assembly may further include a return spring. One end of the return spring is connected to the button, and the other end is connected to the shielding cover body. The return spring is configured to exert, on the button, acting force opposite to a pressing direction.

In an embodiment, this application further provides an extension assembly that can be configured to adjust a direction of an extension circuit. The extension assembly includes a rotation assembly. The extension circuit is connected to the second housing by using the rotation assembly, and the rotation assembly is configured to drive the extension circuit to rotate, to change an orientation or a position of the extension circuit.

In an embodiment, the rotation assembly may include a motor. A stator of the motor is fixed on the second housing, and a rotor is fixedly connected to the extension circuit. When the rotor rotates, the orientation of the extension circuit may be changed, so that use performance of the extension circuit can be improved.

According to another aspect, this application further provides an extension assembly, where the extension assembly is configured to be detachably connected to a primary device assembly; the extension assembly includes an extension circuit and a housing; and the extension circuit is electrically connected to a primary body circuit in the primary device assembly.

In an embodiment, a shielding cover assembly may be equipped in the extension assembly. The shielding cover assembly may be disposed on a top portion and a side portion of the housing in a covering manner, to provide a good shielding effect on the housing and prevent the housing from being affected by sun exposure, rain, sand, dust, or the like.

In an embodiment, the shielding cover assembly may include a shielding cover body for covering a periphery of housing. The shielding cover body may be fixedly connected to the housing in a clamping manner. A clamping hook may be disposed on the housing, a slot is provided with the shielding cover body, and a quick connection between the shielding cover body and the housing can be implemented through clamping and a fit between the clamping hook and the slot.

To facilitate removal of the shielding cover body from the housing, the shielding cover assembly may further include a button. A user may separate the clamping hook from the slot by pressing the button, to separate the shielding cover body from the housing. In an embodiment, the button may include a pressing portion for an operation by a human hand and a pressing portion for pushing the clamping hook. When the shielding cover assembly is removed from the housing, the human hand acts on the pressing portion of the button to press the button. The pushing portion of the button pushes the clamping hook, so that the clamping hook is elastically deformed and separated from the slot, thereby facilitating removal of the shielding cover assembly from the housing.

In an embodiment, when the button is pressed, to ensure that the button can be located on a correct moving path, a positioning rod may be further disposed for the button, a sliding hole may be provided with the shielding cover body, and the positioning rod is slidably disposed in the sliding hole. When the human hand exerts pressure on the button, the button can slide along a length direction of the positioning rod (or the sliding hole), so that a use effect of the button can be effectively improved.

In an embodiment, after the button is pressed, to enable the button to automatically return to a position used when the button is not pressed, the shielding cover assembly may further include a return spring. One end of the return spring is connected to the button, and the other end is connected to the shielding cover body. The return spring is configured to exert, on the button, acting force opposite to a pressing direction.

In an embodiment, this application further provides an extension assembly that can be configured to adjust a direction of an extension circuit. The extension assembly includes a rotation assembly. The extension circuit is connected to the housing by using the rotation assembly, and the rotation assembly is configured to drive the extension circuit to rotate, to change an orientation or a position of the extension circuit.

In an embodiment, the rotation assembly may include a motor. A stator of the motor is fixed on the housing, and a rotor is fixedly connected to the extension circuit. When the rotor rotates, the orientation of the extension circuit may be changed, so that use performance of the extension circuit can be improved.

During specific application, the primary device assembly may be a camera, an outdoor base station (for example, a base station configured to receive and send a wireless signal), or the like. A type of the primary device assembly is not limited in this application.

DESCRIPTION OF EMBODIMENTS

Figure 1:
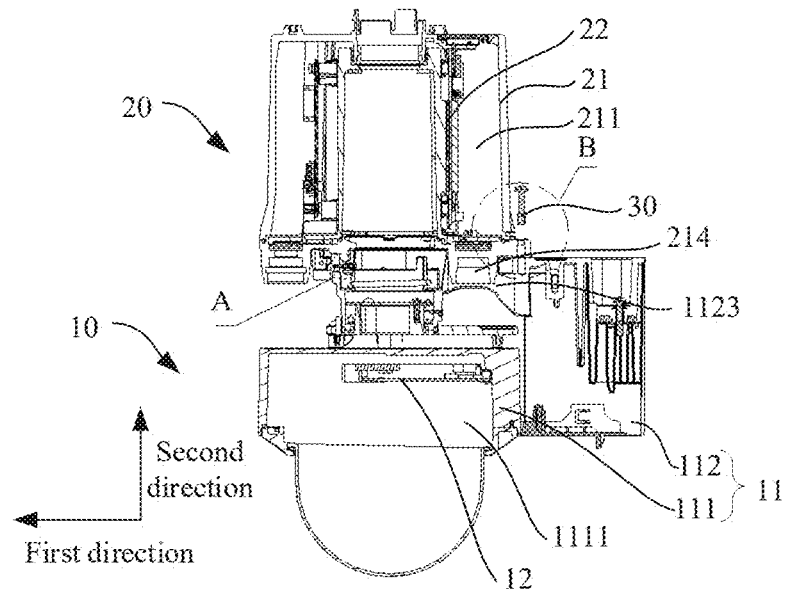
FIG. 1 is a schematic diagram of a cross-sectional structure of an electronic device according to an embodiment of this application.

To make objectives, technical solutions, and advantages of this application clearer, the following further describes this application in detail with reference to the accompanying drawings.

To facilitate understanding of an extension assembly provided in an embodiment of this application, an application scenario of the extension assembly is first described below.

The extension assembly provided in this application may be used in a primary device assembly such as a camera or an outdoor base station, to extend and improve functionality of the corresponding primary device assembly. A camera is used as an example. The camera generally includes a lens assembly, and the lens assembly is configured to implement an image information collection function. Currently, to enable a camera to have an information processing capability (such as face recognition or vehicle license plate recognition), some manufacturers usually add an additional processor to the camera. However, to ensure air tightness of a lens assembly, the processor can be installed only before the camera is delivered. Therefore, installation of the processor cannot be properly adjusted on an engineering site. In addition, some manufacturers usually add a wireless communication circuit to the camera to enable the camera to have a wireless communication function. However, during actual application, to meet a heat dissipation requirement of the camera, the camera usually uses a metal housing, for example an aluminum alloy housing. Therefore, to prevent a signal of the wireless communication circuit from being shielded by the metal housing, the wireless communication circuit can be installed only on the housing of the camera, but cannot be installed inside the camera. When the wireless communication circuit is installed on the housing, the wireless communication circuit occupies a part of an area of the housing, thereby deteriorating heat dissipation of the camera. In addition, during actual application, the wireless communication circuit needs to be connected to a camera body by using a cable, and a position at which the cable is connected to the camera body needs to be sealed, to ensure air tightness of the lens assembly. In addition, after sealing is completed, an air tightness test further needs to be performed on the lens assembly. Therefore, installation of the wireless communication circuit can be performed only before delivery, but cannot be performed on an engineering site (or after the camera is delivered). Consequently, there is a great limitation.

During actual application, because a camera has a plurality of different application scenarios, and different users have different function requirements for the camera, types and quantities of functional circuits added to the camera also vary greatly. However, due to an air tightness requirement of the lens assembly (or the camera), the functional circuit installed in the camera can be configured only before delivery, which may cause incomplete functions or redundant functions during actual application. It can be understood that the foregoing camera includes but is not limited to a type such as a spherical camera, a hemispherical camera, a barrel camera, or the like. In addition, the foregoing simply uses the camera as an example for brief description. However, during actual application, when a functional circuit is installed in a primary device assembly such as an outdoor base station (for example, a base station configured to receive and send a radio signal), the primary device assembly also faces a technical problem the same as or similar to that of the foregoing camera.

Therefore, embodiments of this application provide an extension assembly that can implement flexible and quick installation, and an electronic device equipped with the extension assembly.

To make objectives, technical solutions, and advantages of this application clearer, the following further describes this application in detail with reference to the accompanying drawings and specific embodiments.

Terms used in the following embodiments are merely intended to describe particular embodiments, but are not intended to limit this application. The terms "one", "a", and "this" of singular forms used in this specification and the appended claims of this application are also intended to include expressions such as "one or more", unless otherwise specified in the context clearly. It should be further understood that in the following embodiments of this application, "at least one" and "one or more" refer to one, two, or more. The term and/or describes an association relationship for describing associated objects and represents that three relationships may exist. For example, A and/or B may represent the following cases: Only A exists, both A and B exist, and only B exists, where A and B may be singular or plural. The character "/" usually indicates an "or" relationship between associated objects.

Reference to "one embodiment", "some embodiments", or the like described in this specification means that a particular feature, structure, or characteristic described with reference to one or more embodiments is included in the one or more embodiments of this application. Therefore, statements such as "in an embodiment", "in some embodiments", "in some other embodiments", and "in other embodiments" that appear at different places in this specification do not necessarily mean referring to a same embodiment. Instead, the statements mean "one or more but not all of embodiments", unless otherwise specifically emphasized in another manner. The terms "include", "have", and their variants all mean "include but are not limited to", unless otherwise specifically emphasized in another manner.

As shown in FIG. 1, an embodiment of this application provides an electronic device, including a primary device assembly 10 and an extension assembly 20. The primary device assembly 10 includes a first housing 11 and a primary body circuit 12, the first housing 11 has a first accommodation cavity 1111, and the primary body circuit 12 is disposed in the first accommodation cavity 1111. The extension assembly 20 includes a second housing 21 and an extension circuit 22. The second housing 21 has a second accommodation cavity 211, the extension circuit 22 is disposed in the second accommodation cavity 211, and the extension circuit 22 is signal-connected to the primary body circuit 12, to extend or enhance functionality of the primary device assembly 10. To implement quick installation and disassembly between the extension assembly 20 and the primary device assembly 10, the first housing 11 has a first installation structure (not shown in the figure), the second housing 21 has a second installation structure (not shown in the figure), and the first installation structure is detachably connected to the second installation structure, to implement a detachable connection between the extension assembly 20 and the primary device assembly 10.

In an embodiment, types and quantities of extension circuits 22 included in the extension assembly 20 may be diversified. For example, the extension circuit 22 may be a communication circuit, for example, a radar, a Wi-Fi module, a 4G communication module, a 5G communication module, or a Bluetooth module, or may be a device, for example, a graphics processing unit, an AI processing chip, or a memory. During actual application, a required extension circuit 22 may be installed in the extension assembly 20 before delivery, or may be installed in the extension assembly 20 on an engineering site, so that greater flexibility is achieved, and no adverse problem is caused, for example, incomplete functions or redundant functions. In addition, when the extension circuit 22 is installed, the primary device assembly 10 does not need to be disassembled or assembled, so that air tightness or the like of the primary device assembly 10 is not affected.

In an embodiment, specific structures and configurations of the extension assembly 20 and the primary device assembly 10 may be diversified.

For example, as shown in FIG. 1, in the embodiment provided in this application, the first housing 11 includes a housing body 111 and a bracket 112. The first accommodation cavity 1111 is located in the housing body 111. The bracket 112 is configured to fasten the housing body 111 at an installation position (for example, on a wall or on a road monitoring pole), and the bracket 112 can further be detachably connected to the second housing 21. That is, the housing body 111 is detachably connected to the second housing 21 by using the bracket 112. It can be understood that, in another embodiment, the second housing 21 may alternatively be fixedly connected to the housing body 111 directly.

During actual application, when functionality of the primary device assembly 10 needs to be extended or improved, a required extension assembly 20 may be installed on the primary device assembly 10 by using the first installation structure and the second installation structure.

Figure 2:
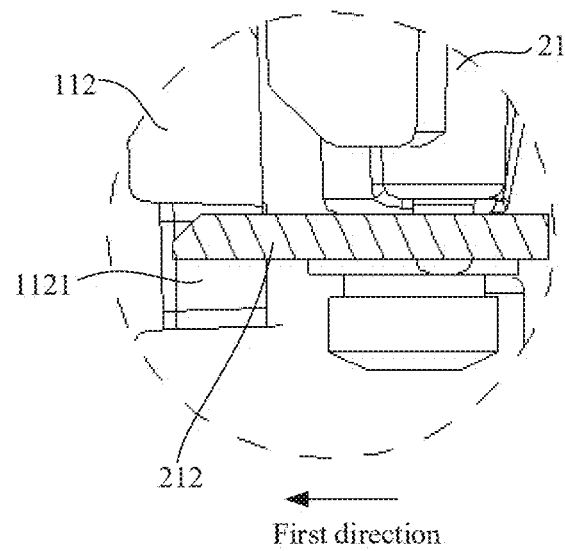
FIG. 2 is a locally enlarged view of a part A in FIG. 1.

As shown in FIG. 2, in an embodiment provided in this application, the first installation structure includes a slot 1121 provided along a first direction; and the second installation structure includes a tongue 212 disposed along the first direction. Specifically, the tongue 212 can be inserted into the slot 1121 along the first direction, to implement a fixed connection between the bracket 112 and the second housing 21. When the extension assembly 20 and the primary device assembly 10 are to be assembled, quick installation and disassembly between the extension assembly 20 and the primary device assembly 10 can be implemented through a mutual plug-connection and fit between the tongue 212 and the slot 1121. In addition, disassembly and assembly steps are simple, thereby helping improve convenience and efficiency of disassembly and assembly.

In an embodiment, shape contours of the tongue 212 and the slot 1121 may be approximately the same, so that relative stability between the tongue 212 and the slot 1121 can be improved. For example, when the tongue 212 is of a rectangular sheet-shaped structure, the slot 1121 may alternatively be of a rectangular groove-shaped structure. After the tongue 212 is inserted into the slot 1121, a side surface of the tongue 212 may abut against an inner wall of the slot 1121, or a small gap may be maintained between the side surface of the tongue 212 and the inner wall of the slot 1121, to prevent an adverse situation, for example, the tongue 212 obviously shakes in the slot 1121. It can be understood that, in another embodiment, the tongue 212 may alternatively be a plate-shaped structure with a shape contour, for example, a semicircular shape or a triangle shape. Correspondingly, the slot 1121 may alternatively be of a groove structure with a shape contour, for example, a semicircular shape or a triangle shape.

In some embodiments, the tongue 212 and the slot 1121 may alternatively be assembled in an interference fit manner. For example, a size of the tongue 212 may be slightly greater than a size of the slot 1121, so that when the tongue 212 is inserted into the slot 1121, a tight fit may be formed between the tongue 212 and the inner wall of the slot 1121, to prevent an adverse situation, for example, loosening.

During manufacturing, the tongue 212 and the second housing 21 may be two mutually independent mechanical parts, or may be an integrated mechanical part. Specifically, when the tongue 212 and the second housing 21 are two mutually independent mechanical parts, the tongue 212 and the second housing 21 may be separately manufactured and formed, and the tongue 212 is installed on the second housing 21 through welding or by using a fastener, for example, a screw. When the tongue 212 and the second housing 21 are an integrated mechanical part, a tongue structure may be directly formed on the second housing 21 through injection molding or the like.

It can be understood that, in the foregoing embodiment, the tongue 212 is disposed on the second housing 21, and the slot 1121 is provided with the bracket 112. In another embodiment, a position of the tongue 212 may alternatively be interchanged with a position of the slot 1121. That is, the tongue 212 may be disposed on the bracket 112, and the slot 1121 may be provided with the second housing 21.

In an embodiment, a quantity of tongues 212 is two or more. Correspondingly, a quantity of slots 1121 may alternatively be adaptively adjusted based on the quantity of tongues 212. This is not specifically limited in this application.

In an embodiment, to improve stability of a connection between the extension assembly 20 and the primary device assembly 10, a detachable connection between the extension assembly 20 and the primary device assembly 10 may be implemented by using another connection structure.

Figure 3:
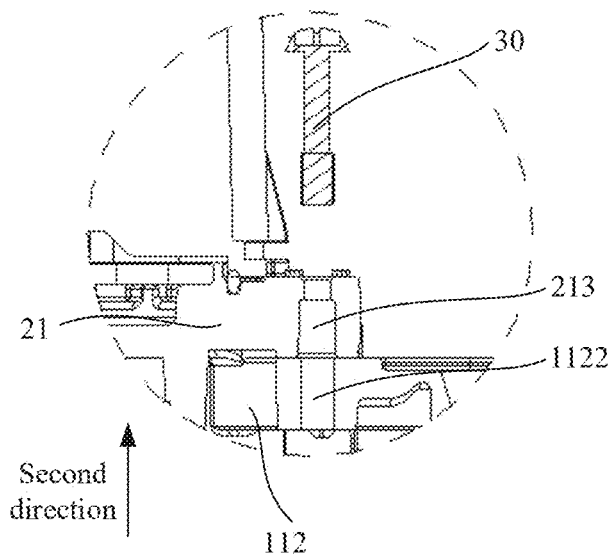
FIG. 3 is a locally enlarged view of a part B in FIG. 1.

For example, as shown in FIG. 3, in an embodiment provided in this application, a first connection hole 1122 is provided with the bracket 112, a second connection hole 213 is provided with the second housing 21, and the first connection hole 1122 and the second connection hole 213 are connected by using a fastener 30.

In an embodiment, the first connection hole 1122 may be a threaded hole, the second connection hole 213 may be a through hole, and the fastener 30 may be a bolt. During installation, the fastener 30 may be inserted from an upper end of the second connection hole 213, and the fastener 30 is thread-connected to the first connection hole 1122, to implement a detachable connection between the first connection hole 1122 and the second connection hole 213.

As shown in FIG. 2 and FIG. 3, during installation, the tongue 212 may be first inserted into the slot 1121, to implement relative fixing between the bracket 112 and the second housing 21. Then, the fastener 30 is inserted into the first connection hole 1122 and the second connection hole 213, to implement a fixed connection between the first connection hole 1122 and the second connection hole 213, thereby implementing a fixed connection between the bracket 112 and the second housing 21.

In an embodiment, to improve an effect of a connection between the bracket 112 and the second housing 21, a disposing direction of the tongue 212 (or the slot 1121) and a disposing direction of the first connection hole 1122 (or the second connection hole 213) may be provided at an included angle.

For example, in the embodiment provided in this application, both the tongue 212 and the slot 1121 are disposed along the first direction, both the first connection hole 1122 and the second connection hole 213 are disposed along the second direction, and the first direction and the second direction are perpendicular to each other. After the tongue 212 is inserted into the slot 1121, position limiting may be formed on the second housing 21 and the bracket 112 in the second direction, to prevent the second housing 21 from generating, in the second direction, position offset relative to the bracket 112. After the fastener 30 is configured to fixedly connect the first connection hole 1122 and the second connection hole 213, position limiting may be formed on the second housing 21 and the bracket 112 in the first direction, to effectively prevent the second housing 21 from generating, in the first direction, position offset relative to the bracket 112, to effectively improve relative stability between the second housing 21 and the bracket 112, and avoid position offset between the second housing 21 and the bracket 112. In addition, because a mutual fit between the tongue 212 and the slot 1121 can form position limiting on the second housing 21 and the bracket 112 in the second direction, an adverse problem can be avoided to some extent, for example, loosening between the fastener 30 and the first connection hole 1122, or loosening between the fastener 30 and the second connection hole 213.

In an embodiment, the included angle between the first direction and the second direction may be properly set based on different situations. Specifically, the included angle between the first direction and the second direction may be between 0° and 90°.

It can be understood that, in another embodiment, the first connection hole 1122 may be a through-hole structure, and the second connection hole 213 may be a threaded hole. During installation, the fastener 30 may be inserted from one end of the first connection hole 1122, and then the fastener 30 is thread-connected to the second connection hole 213, to implement a detachable connection between the first connection hole 1122 and the second connection hole 213.

In addition, in another embodiment, specific types of the first connection hole 1122, the second connection hole 213, and the fastener 30 may be adaptively adjusted based on an actual requirement. For example, the first connection hole 1122 and the second connection hole 213 may alternatively be pin holes or the like, and correspondingly, the fastener 30 may be a pin or the like.

Figure 4:
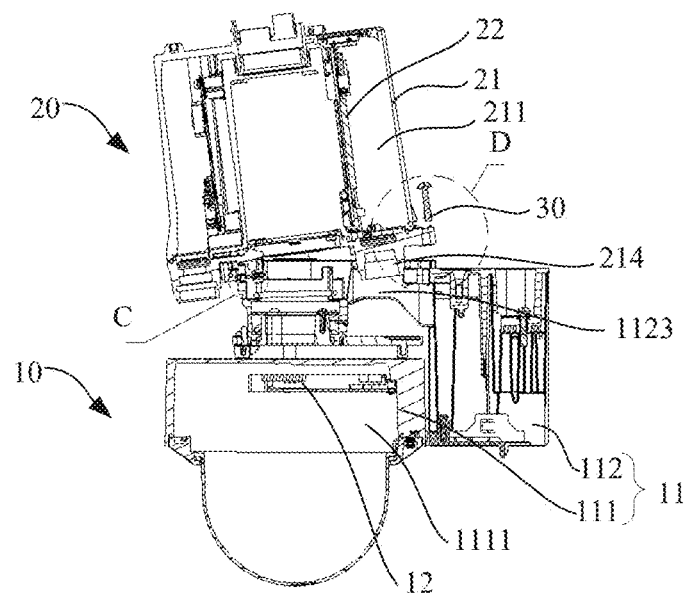
FIG. 4 is a schematic diagram of a cross-sectional structure of an electronic device during assembly according to an embodiment of this application.

In an embodiment, as shown in FIG. 4, to facilitate a signal connection between the primary device assembly 10 and the extension assembly 20, the primary device assembly 10 may further include a first connector 1123, and the extension assembly 20 may further include a second connector 214. When the extension assembly 20 and the primary device assembly 10 are to be assembled, a signal connection between the primary device assembly 10 and the extension assembly 20 can be implemented through docking between the first connector 1123 and the second connector 214.

Specifically, in an embodiment provided in this application, the first connector 1123 is disposed on the bracket 112, and a lower end of the first connector 1123 is electrically connected to the primary body circuit 12. The second connector 214 is disposed on the second housing 21, and an upper end of the second connector 214 is electrically connected to the extension circuit 22. After the first connector 1123 is docked with the second connector 214, a signal connection between the primary body circuit 12 and the extension circuit 22 can be implemented.

In an embodiment, the first connector 1123 may be plug-connected to the second connector 214 in the second direction. When the extension assembly 20 is installed on the primary device assembly 10, both a fixed connection between the extension assembly 20 and the primary device assembly 10 and docking between the first connector 1123 and the second connector 214 can be implemented.

Figure 5:
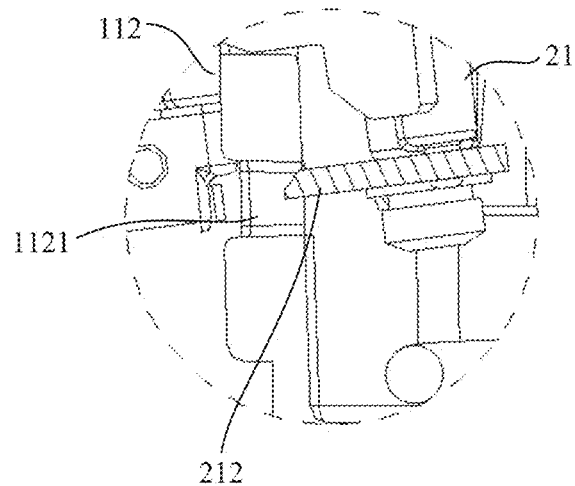
FIG. 5 is a locally enlarged view of a part C in FIG. 4.
Figure 6:
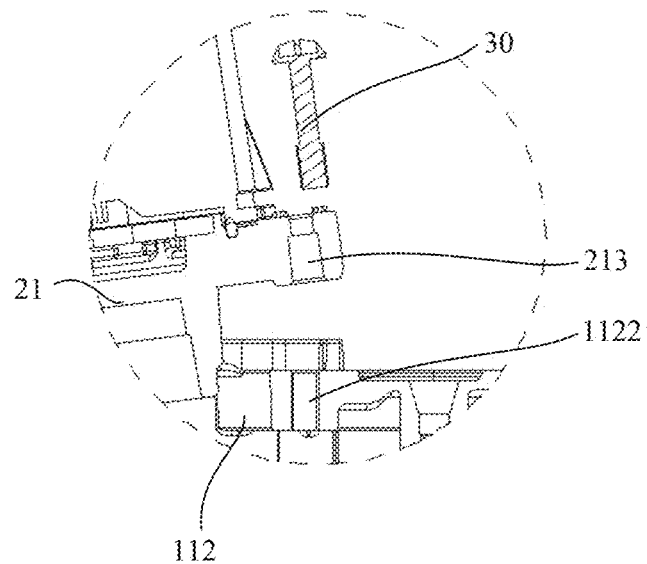
FIG. 6 is a locally enlarged view of a part D in FIG. 4.

As shown in FIG. 4 to FIG. 6, during installation, a relative inclined posture may be maintained between the extension assembly 20 and the primary device assembly 10, so that an insertion end of the tongue 212 is located at an opening of the slot 1121. The extension assembly 20 is pressed downward, so that the tongue 212 is gradually inserted into the slot 1121, and the first connector 1123 is gradually docked with the second connector 214. After the tongue 212 is completely inserted into the slot 1121, the first connector 1123 is docked with the second connector 214, and the first connection hole 1122 and the second connection hole 213 maintain in a coaxially aligned state. Finally, the fastener 30 is inserted into the first connection hole 1122 and the second connection hole 213, so that the first connection hole 1122 and the second connection hole 213 are fixedly connected. Finally, assembly between the extension assembly 20 and the primary device assembly 10 is implemented.

In the foregoing implementation, quick installation between the extension assembly 20 and the primary device assembly 10 can be implemented through a plug-connection and fit between the tongue 212 and the slot 1121, and a fit between the first connection hole 1122 and the second connection hole 213. In addition, during assembly, docking between the first connector 1123 and the second connector 214 can be implemented, to implement a signal connection between the extension assembly 20 and the primary device assembly 10. Installation steps are simple, thereby facilitating improvement of convenience and efficiency of assembly.

In some embodiments, to ensure structural safety of the tongue 212 and prevent occurrence of an adverse situation, for example, prevent the tongue 212 from being broken, the tongue 212 may have elasticity. When the extension assembly 20 and the primary device assembly 10 maintain a relative inclined posture for assembly, the tongue 212 may better match the slot 1121 through elastic deformation of the tongue 212, thereby effectively improving an installation effect and structural safety.

In an embodiment, the housing body 111 and the bracket 112 may be connected in various manners.

Figure 7:
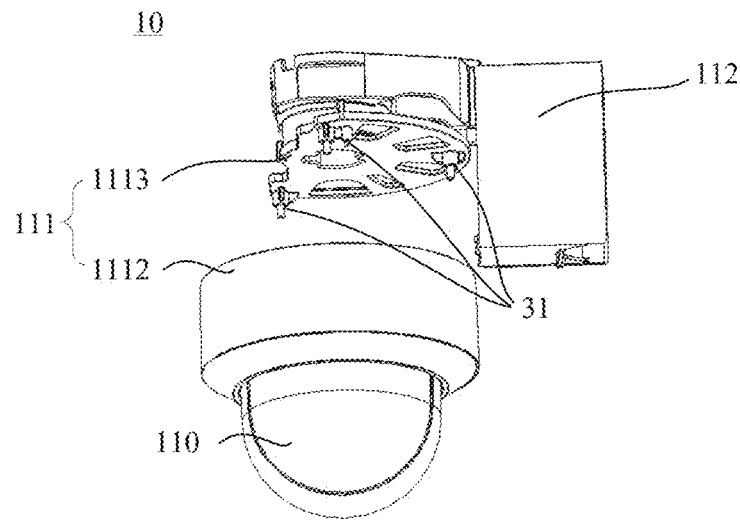
FIG. 7 is a schematic diagram of an exploded structure of a primary device assembly according to an embodiment of this application.

As shown in FIG. 7, in the embodiment provided in this application, the housing body 111 is rotatably and adjustably disposed on the bracket 112. That is, the housing body 111 can rotate relative to the bracket 112. A lens assembly 110 is installed in the housing body 111. An orientation of the lens assembly 110 can be adjusted by adjusting a rotation angle of the housing body 111, to change and increase an image capture range of the lens assembly 110.

Specifically, the housing body 111 includes a base 1112 and a connection plate 1113, and the base 1112 and the connection plate 1113 are fixedly connected by using a screw 31.

Three through holes (not shown in the figure) are provided with the connection plate 1113. Three threaded holes (not shown in the figure) are provided with a side (an upper side) of the base 1112 facing the connection plate 1113. The three through holes are provided in a one-to-one correspondence with the three threaded holes. After three screws 31 respectively penetrate and are fixed in the corresponding through holes and the corresponding threaded holes, a fixed connection between the connection plate 1113 and the base 1112 can be implemented.

It can be understood that, in another embodiment, a providing quantity and positions of through holes and a providing quantity and positions of threaded holes may be adaptively adjusted based on different requirements. Alternatively, the connection plate 1113 and the base 1112 may be fixedly connected in a manner, for example, through clamping or through welding. This is not limited in this application.

Figure 8:
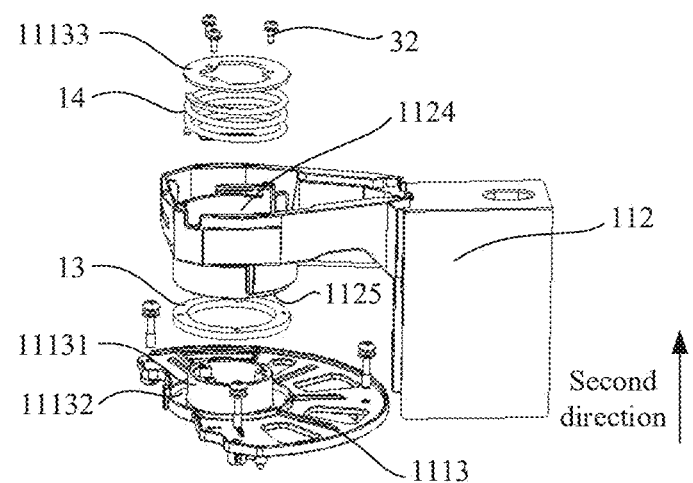
FIG. 8 is a schematic diagram of an exploded structure of a partial structure of a primary device assembly according to an embodiment of this application.

To implement rotatable adjustment between the housing body 111 and the bracket 112, as shown in FIG. 8, a through hole 1124 provided along the second direction is provided with the bracket 112, a convex shaft 11131 disposed along the second direction is disposed on the connection plate 1113, and the convex shaft 11131 is inserted into the through hole 1124, so that the connection plate 1113 can rotate with an axis of the convex shaft 11131 (or the through hole 1124) as a rotation center.

A first friction surface 1126 disposed downward is disposed on a bottom portion of the bracket 112, a second friction surface 11132 disposed upward is disposed on the connection plate 1113, and a friction ring 13 is disposed between the first friction surface 1126 and the second friction surface 11132. After an upper surface of the friction ring 13 is attached to the first friction surface 1126, and a lower surface of the friction ring 13 is attached to the second friction surface 11132, under an action of friction force, the connection plate 1113 can be prevented from rotating relative to the bracket 112. When the first friction surface 1126 is in a non-contact state with the friction ring, or the second friction surface 11132 is in a non-contact state with the friction ring 13, the connection plate 1113 may be manually rotated, so that the connection plate 1113 rotates relative to the bracket 112.

In an embodiment, in a normal state, to enable the first friction surface 1126 and the friction ring 13 to maintain an attached state, and the second friction surface 11132 and the friction ring 13 to maintain an attached state, in the embodiment provided in this application, a compressing spring 14 is further disposed between the bracket 112 and the connection plate 1113.

Figure 9:
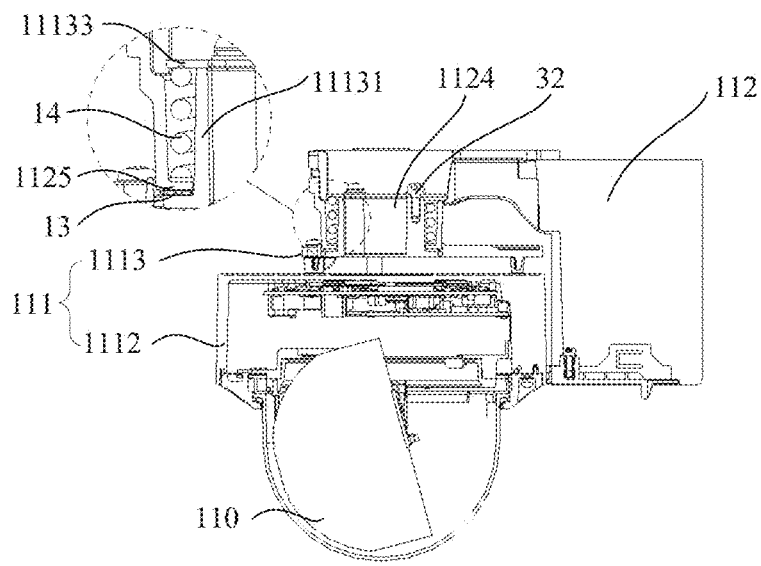
FIG. 9 is a schematic diagram of a cross-sectional structure of a primary device assembly according to an embodiment of this application.

Refer to FIG. 8 and FIG. 9 together. Specifically, an inwardly extending flange 1125 is disposed on an inner wall of the through hole 1124, a retaining ring 11133 is installed on a top portion of the convex shaft 11131, and the compression spring 14 is sleeved on a periphery of the convex shaft 11131. An upper end of the compression spring 14 abuts against a lower side of the retaining ring 11133, and a lower end of the compression spring 14 abuts against the flange 1125. That is, the compression spring 14 is disposed between the connection plate 1113 and the bracket 112 for exerting upward elastic force on the retaining ring 11133. Because the retaining ring 11133 is fixedly connected to the connection plate 1113, the compression spring 14 can exert upward elastic force on the connection plate 1113, to press the friction ring 13 between the first friction surface 1126 and the second friction surface 11132, so that the first friction surface 1126 and the friction ring 13 maintain an attached state, and the second friction surface 11132 and the friction ring 13 maintain an attached state. When the rotation angle of the connection plate 1113 (or the housing body 111) needs to be adjusted, a human hand acts on and lifts up the connection plate 1113 (or the housing body 111), so that the first friction surface 1126 is in a non-contact state with the friction ring 13, and the second friction surface 11132 is in a non-contact state with the friction ring 13. In this way, the connection plate 1113 (or the housing body 111) can be easily rotated, so that the rotation angle of the connection plate 1113 (or the housing body 111) can be adjusted.

In an embodiment, the friction ring 13 may be of a ring-shaped structure made of a material, for example, silicone or foam, so that a large coefficient of friction exists between the friction ring 13 and the first friction surface 1126 and between the friction ring 13 and the second friction surface 11132. In addition, the friction ring 13 can further play a shock absorption effect, and can effectively reduce shock transferring between the connection plate 1113 and the bracket 112.

During installation, the friction ring 13 may be first sleeved on the periphery of the convex shaft 11131, the convex shaft 11131 penetrates in the through hole, and the compression spring 14 is sleeved on the periphery of the convex shaft 11131. Finally, the retaining ring 11133 is fixed on the top portion of the convex shaft 11131 by using a screw 32, to implement a fixed connection between the retaining ring 11133 and the convex shaft 11131, and the compression spring 14 is pressed between the retaining ring 11133 and the flange 1125.

It can be understood that, in another embodiment, roughening may be further performed on the first friction surface 1126 and the second friction surface 11132, to increase friction between the first friction surface 1126 and the friction ring 13, and friction between the second friction surface 11132 and the friction ring 13. In an embodiment, in addition to a ring-shaped structure, the friction ring 13 may be disposed in a sheet-shaped structure, a block-shaped structure, or the like. A specific shape and a specific material of the friction ring 13 are not limited in this application. Alternatively, in another embodiment, the friction ring 13 may be omitted, so that the first friction surface 1126 is in direct contact with the second friction surface 11132. Alternatively, tooth structures that mesh with each other may be disposed on the first friction surface 1126 and the second friction surface 11132, to improve an effect of locking between the connection plate 1113 and the bracket 112.

In an embodiment, shapes and structures of the extension assembly 20 may alternatively be diversified.

Figure 10:
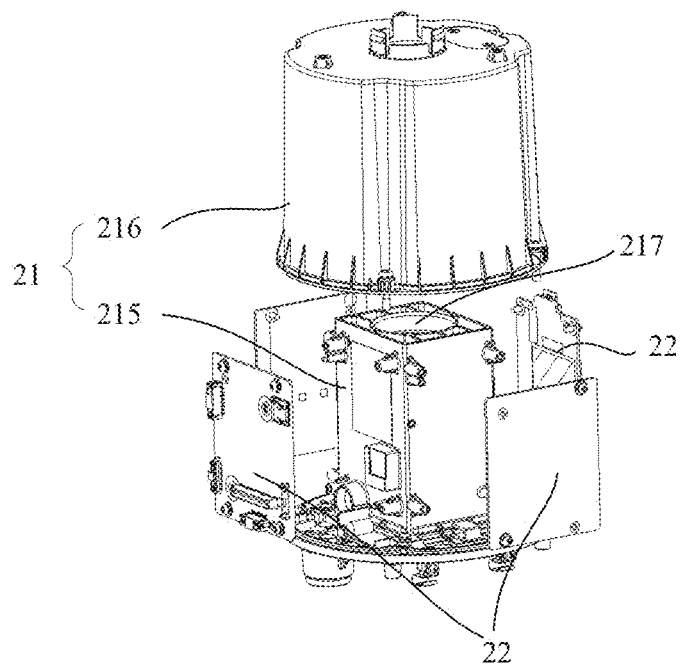
FIG. 10 is a schematic diagram of an exploded structure of an extension assembly according to an embodiment of this application.
Figure 11:
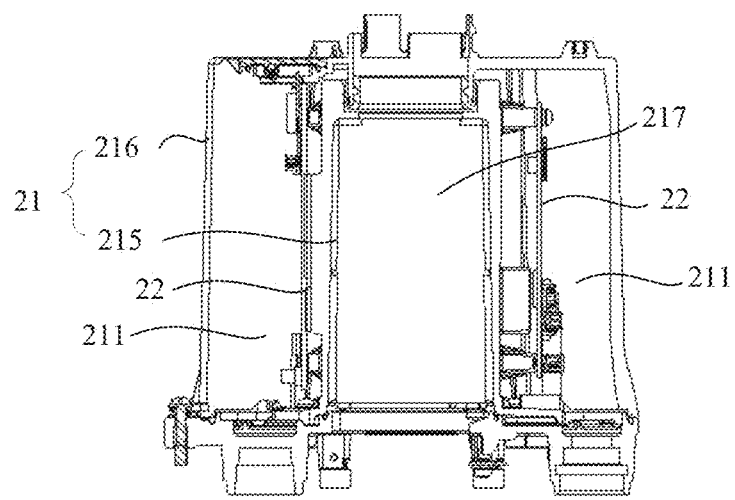
FIG. 11 is a schematic diagram of a cross-sectional structure of an extension assembly according to an embodiment of this application.

As shown in FIG. 10 and FIG. 11, in an embodiment provided in this application, the second housing 21 includes two parts: an inner housing 215 and an outer housing 216. The outer housing 216 is sleeved on a periphery of the inner housing 215, so that the inner housing 215 and the outer housing 216 enclose the second accommodation cavity 211 for installing the extension circuit 22.

Specifically, the inner housing 215 is constructed as a hollow structure. A cross section of an inner contour is circular, and a cross section of an outer contour is quadrilateral. Space enclosed by the inner contour forms a ventilation channel 217 that is up-and-down communicated. The extension circuit 22 may be fixedly connected to a quadrilateral side surface of the inner housing 215, and a heat emitting element in the extension circuit 22 may be thermally connected to the inner housing 215 by using a medium, for example, thermally conductive silicone, so that heat generated by the heat emitting element can be effectively transferred to the inner housing 215 for heat dissipation.

In an embodiment, a plurality of extension circuits 22 may be disposed, and the plurality of extension circuits 22 may be disposed on different surfaces of the inner housing 215. For example, when a quantity of disposed extension circuits 22 is four, the four extension circuits 22 may be distributed on four side surfaces of the inner housing 215. It can be understood that, in another embodiment, the quantity and positions of the disposed extension circuits 22 may be adaptively adjusted based on an actual situation. In addition, a shape contour of the inner housing 215 may alternatively be another shape structure. For example, the cross section of the inner contour of the inner housing 215 may be of a circular structure, an oval structure, a square structure, or another polygonal structure. The cross section of the outer contour may be of a circular structure, an oval structure, a square structure, or another polygonal structure. In addition, a shape of the cross section of the inner contour and a shape of the cross section of the outer contour of the inner housing 215 may be the same or different. For example, both the cross sections of the inner and outer contours of the inner housing 215 may be circular. Alternatively, the cross section of the inner contour in the inner housing 215 is circular and the cross section of the outer contour is square.

According to another aspect, an embodiment of this application further provides an extension assembly 20 that can be configured to adjust a direction of an extension circuit 22.

Figure 12:
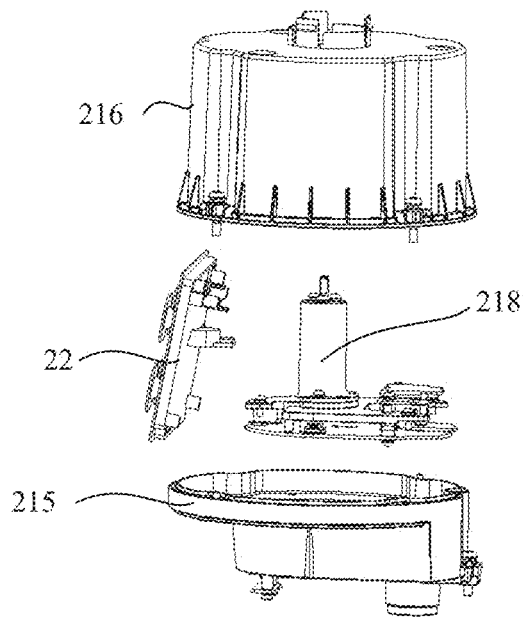
FIG. 12 is a schematic diagram of an exploded structure of another extension assembly according to an embodiment of this application.
Figure 13:
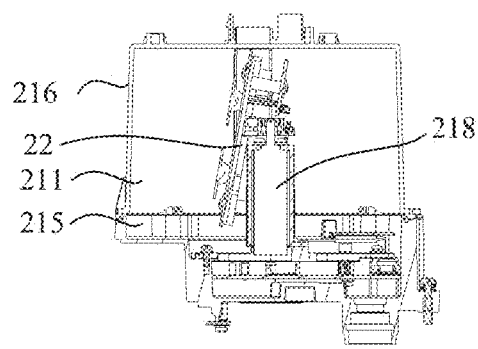
FIG. 13 is a schematic diagram of a cross-sectional structure of another extension assembly according to an embodiment of this application.

As shown in FIG. 12 and FIG. 13, in an embodiment provided in this application, an outer housing 216 is buckled on an upper side of an inner housing 215, thereby enclosing a second accommodation cavity 211. A rotation assembly (not shown in the figure) is further disposed in the extension assembly 20, and the extension circuit 22 is fixed in the second accommodation space 211 by using the rotation assembly.

Specifically, the rotation assembly includes a motor 218. A stator of the motor 218 is fixed on the inner housing 215, and a rotor is fixedly connected to the extension circuit 22. When the rotor rotates, an orientation of the extension circuit 22 may be changed, so that use performance of the extension circuit 22 can be improved. For example, when the extension circuit 22 includes a device, for example, a Wi-Fi module or a radio frequency module, a transmission direction of an electromagnetic wave may be adjusted by adjusting an orientation of the Wi-Fi module or the radio frequency module, so that use performance of the extension circuit 22 can be effectively improved.

In an embodiment, a rotation direction of the extension circuit 22 may be correspondingly set based on different requirements. For example, in the embodiment provided in this application, the motor 218 is vertically disposed, so that the extension circuit 22 can rotate around a rotation center of the motor. It can be understood that, In an embodiment, the motor 218 may alternatively be disposed obliquely or horizontally.

In another embodiment, a transmission connection may be implemented between an output shaft of the motor 218 and the extension circuit 22 by using a transmission mechanism, for example, a belt, a gear, or a chain, so that the motor 218 can drive the extension circuit 22 to rotate.

According to another aspect, an embodiment of this application further provides an extension assembly 20 on which a shielding cover assembly 23 is configured.

Figure 14:
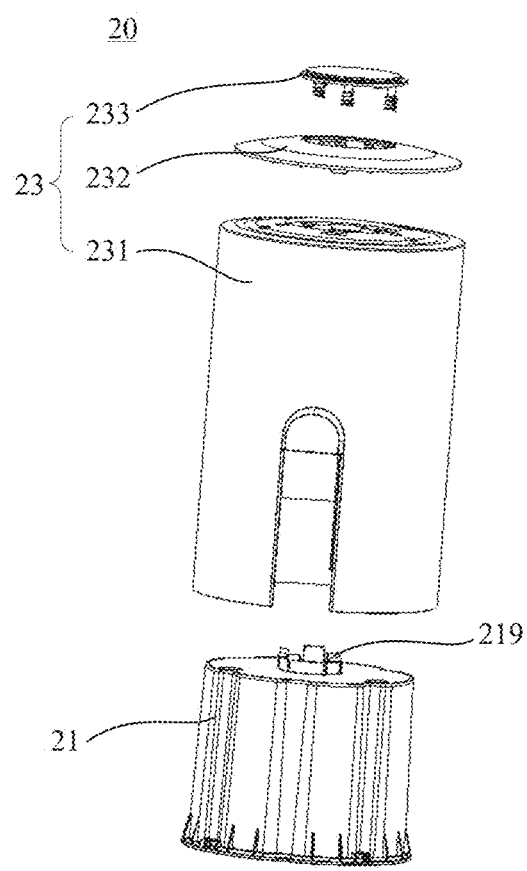
FIG. 14 is a schematic diagram of an exploded structure of a partial structure of another extension assembly according to an embodiment of this application.

Specifically, as shown in FIG. 14, in the embodiment of this application, the shielding cover assembly 23 may be disposed on a top portion and a side portion of a second housing 21 in a covering manner, to provide a good shielding effect on the second housing 21 and prevent the second housing 21 from being affected by sun exposure, rain, sand, dust, or the like.

In the embodiment provided in this application, the shielding cover assembly 23 includes a shielding cover body 231 and an upper cover 232. Specifically, the shielding cover body 231 is constructed as a cylindrical structure, and the upper cover 232 is disposed at an upper end of the shielding cover body 231 to prevent dust, rain, or the like from entering the shielding cover body 231.

In an embodiment, the upper cover 232 and the shielding cover body 231 may be connected in various manners.

Figure 15:
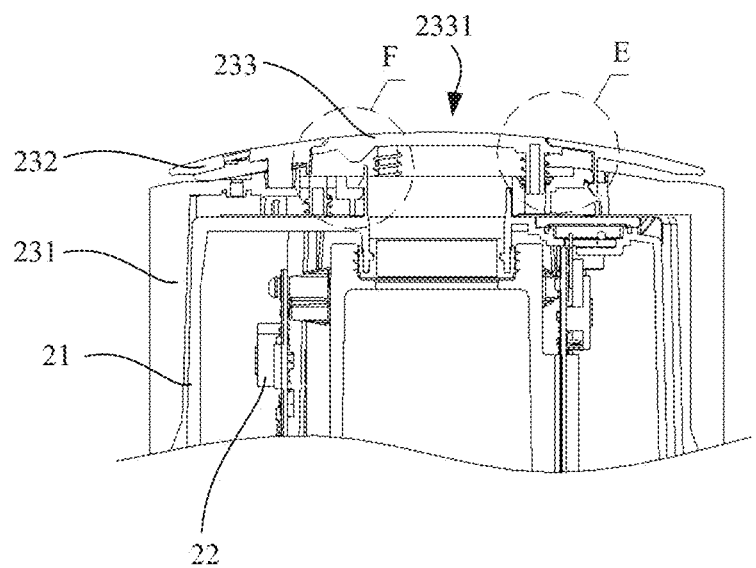
FIG. 15 is a schematic diagram of a local cross-sectional structure of another extension assembly according to an embodiment of this application.
Figure 16:
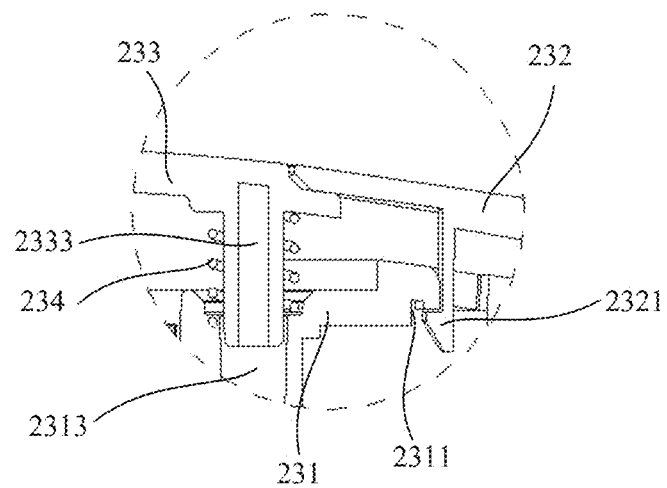
FIG. 16 is a locally enlarged view of a part E in FIG. 15.

For example, as shown in FIG. 15 and FIG. 16, in the embodiment provided in this application, the upper cover 232 and the shielding cover body 231 are fixedly connected in a clamping manner. A clamping hook 2321 extending downward is disposed on a bottom side of the upper cover 232, and a slot 2311 is provided with an upper side of the shielding cover body 231. During assembly, the upper cover 232 may be placed on the upper side of the shielding cover body 231, and the upper cover 232 may be pressed downward with force, so that the clamping hook 2321 and the slot 2311 are clamped with each other. In this way, assembly between the upper cover 232 and the shielding cover body 231 can be implemented.

It can be understood that, in another embodiment, the upper cover 232 and the shielding cover body 231 may alternatively be fixedly connected through bonding, a threaded connection, welding, or the like. Alternatively, in some other implementations, the upper cover 232 and the shielding cover body 231 may be of an integrated structure. For example, the upper cover 232 and the shielding cover body 231 may be directly molded into an integrated structure by using an injection molding process.

In an embodiment, the shielding cover body 231 and the second housing 21 may alternatively be connected in a plurality of manners.

Figure 17:
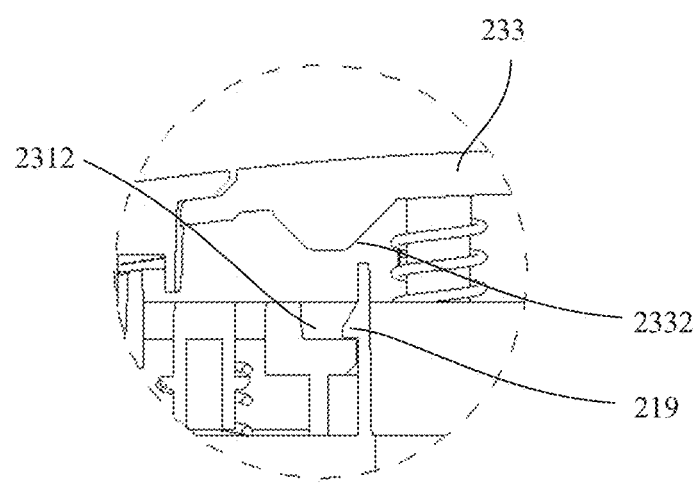
FIG. 17 is a locally enlarged view of a part F in FIG. 15.

For example, as shown in FIG. 15 and FIG. 17, in an embodiment provided in this application, alternatively, the shielding cover body 231 and the second housing 21 are fixedly connected in a clamping manner. A clamping hook 219 that extends upward is disposed on the top portion of the second housing 21, and a slot 2312 is provided with a lower side of the shielding cover body 231. The clamping hook 219 and the slot 2312 are clamped and fit together to implement a quick connection between the shielding cover body 231 and the second housing 21.

When the shielding cover body 231 is installed on the second housing 21, the shielding cover body 231 may be disposed above the second housing 21 in a covering manner, and the shielding cover body 231 is pressed downward, so that the clamping hook 219 is clamped with the slot 2312, and a connection between the shielding cover body 231 and the second housing 21 can be implemented.

To facilitate removal of the shielding cover body 231 from the second housing 21,
as shown in FIG. 15 and FIG. 17, in the embodiment provided in this application, the shielding cover assembly 23 further includes a button 233. A user may separate the clamping hook 219 from the slot 2312 by pressing the button 233, to separate the shielding cover body 231 from the second housing 21.

As shown in FIG. 15, specifically, when the shielding cover assembly 23 is removed from the second housing 21, a human hand acts on a pressing portion 2331 of the button 233 and presses the button 233 downward.

As shown in FIG. 17, a pushing portion 2332 of the button pushes the clamping hook 219, so that the clamping hook 219 is elastically deformed to the right and is separated from the slot 2312. The shielding cover assembly 23 may be removed from the second housing 21 by lifting up the shielding cover body 231 upward while pressing and holding the button 233. In the embodiment provided in this application, the pushing portion 2332 is configured as a trapezoidal convex structure. It can be understood that, in another embodiment, the pushing portion 2332 may alternatively be configured as a triangular convex structural form or another structural form. This is not specifically limited in this application.

As shown in FIG. 16, when the button 233 is pressed, to ensure that the button 233 can be in a correct moving path, in the embodiment provided in this application, a positioning rod 2333 is further disposed on a bottom portion of the button 233, a sliding hole 2313 is provided with the shielding cover body 231, and the positioning rod 2333 is slidably disposed in the sliding hole 2313. When a human hand exerts pressure on the button 233, the button 233 can slide along a length direction of the positioning rod 2333 (or the sliding hole 2313), so that a use effect of the button 233 can be effectively improved.

In addition, after the button 233 is pressed, to enable the button 233 to automatically return to a position used when the button is not pressed, in the embodiment provided in this application, the shielding cover assembly 23 further includes a return spring 234.

Specifically, the return spring 234 is sleeved on a periphery of the positioning rod 2333, an upper end of the return spring 234 abuts against a bottom surface of the button 233, and a lower end abuts against the shielding cover body 231. When the button 233 is pressed downward under an action of external force, the return spring 234 is compressed and deformed. When the external force is eliminated, the return spring 234 tends to extend and pushes the button 233 to move upward, thereby enable the button 233 to return to the position used when the button is not pressed.

It can be understood that, in an embodiment, the return spring 234 may be in a structural form, for example, a coil spring or a spring plate. This is not specifically limited in this application.

In addition, a disposing quantity and layout positions of positioning rods 2333 and a disposing quantity and layout positions of sliding holes 2313 may be adaptively adjusted based on different requirements.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. An electronic device, comprising a primary device assembly and an extension assembly, wherein
the primary device assembly comprises a first housing and a primary body circuit, wherein the first housing includes a first accommodation cavity, and the primary body circuit is disposed in the first accommodation cavity;

wherein the extension assembly comprises a second housing and an extension circuit, wherein the second housing includes a second accommodation cavity, the extension circuit is disposed in the second accommodation cavity, and the extension circuit is signal-connected to the primary body circuit; and wherein the first housing includes a first installation structure, the second housing includes a second installation structure, and the first installation structure is detachably connected to the second installation structure.

2. The electronic device according to claim 1, wherein the first installation structure comprises a slot provided along a first direction; and the second installation structure comprises a tongue disposed in the first direction, and the tongue is inserted into the slot.

3. The electronic device according to claim 2, wherein the electronic device further comprises a fastener;

the first installation structure further comprises a first connection hole provided along a second direction;

the second installation structure further comprises a second connection hole provided along the second direction; and the first connection hole and the second connection hole are coaxially provided, and the fastener is fixedly connected to the first connection hole and the second connection hole, wherein the first direction and the second direction are provided at an included angle.

4. The electronic device according to claim 2, wherein the first housing further comprises a first connector, wherein the first connector is electrically connected to the primary body circuit;

the second housing further comprises a second connector, wherein the second connector is electrically connected to the extension circuit; and the first connector is plug-connected to the second connector.

5. The electronic device according to claim 4, wherein the first connector is plug-connected to the second connector in a second direction.

6. The electronic device according to claim 1, wherein the first housing comprises a housing body and a bracket, wherein the housing body is detachably connected to the bracket; and the first installation structure is disposed on the housing body or the bracket.

7. The electronic device according to claim 1, wherein the electronic device further comprises a shielding cover assembly; and the shielding cover assembly is detachably connected to the second housing.

8. The electronic device according to claim 7, wherein the shielding cover assembly comprises a shielding cover body and a button;

a clamping hook is disposed on the second housing, a slot is provided with the shielding cover body, and the clamping hook is clamped to the slot; and a pressing portion and a pushing portion are disposed on the button, and when the pressing portion is pressed, the pushing portion pushes the clamping hook, so that the clamping hook is separated from the slot.

9. The electronic device according to claim 8, wherein a sliding hole is provided with the shielding cover body, and a positioning rod is disposed on the button; and the positioning rod is slidably disposed in the sliding hole.

10. The electronic device according to claim 8, wherein the shielding cover assembly further comprises a return spring;

one end of the return spring is connected to the button, and an other end is connected to the shielding cover body; and the return spring is configured to exert, on the button, acting force opposite to a pressing direction.

11. The electronic device according to claim 1, wherein the extension assembly further comprises a rotation assembly; and the extension circuit is connected to the second housing by using the rotation assembly, and the rotation assembly is configured to drive the extension circuit to rotate.

12. The electronic device according to claim 11, wherein the rotation assembly comprises a motor; and the motor comprises a stator and a rotor, the stator is fixedly connected to the second housing, and the rotor is fixedly connected to the extension circuit.

13. An extension assembly, wherein the extension assembly is configured to be detachably connected to a primary device assembly;

the extension assembly comprises an extension circuit, a rotation assembly, and a housing; and the extension circuit is electrically connected to a primary body circuit in the primary device assembly and is connected to the housing by using the rotation assembly, and the rotation assembly is configured to drive the extension circuit to rotate.

14. The extension assembly according to claim 13, wherein the extension assembly further comprises a shielding cover assembly; and the shielding cover assembly is detachably connected to the housing.

15. The extension assembly according to claim 14, wherein the shielding cover assembly comprises a shielding cover body and a button;

a clamping hook is disposed on the housing, a slot is provided with the shielding cover body, and the clamping hook is clamped to the slot; and a pressing portion and a pushing portion are disposed on the button, and when the pressing portion is pressed, the pushing portion pushes the clamping hook, so that the clamping hook is separated from the slot.

16. The extension assembly according to claim 15, wherein a sliding hole is provided with the shielding cover body, and a positioning rod is disposed on the button; and the positioning rod is slidably disposed in the sliding hole.

17. The extension assembly according to claim 15, wherein the shielding cover assembly further comprises a return spring;

one end of the return spring is connected to the button, and an other end is connected to the shielding cover body; and the return spring is configured to exert, on the button, acting force opposite to a pressing direction.

18. The extension assembly according to claim 13, wherein the rotation assembly comprises a motor; and the motor comprises a stator and a rotor, the stator is fixedly connected to the housing, and the rotor is fixedly connected to the extension circuit.

* * * * *